(12) United States Patent
Takahashi

(10) Patent No.: US 8,107,178 B2
(45) Date of Patent: Jan. 31, 2012

(54) STORAGE APPARATUS, METHOD OF DETECTING FAILURE IN HEAD OF STORAGE APPARATUS, AND STORAGE MEDIUM STORING FAILURE DETECTION PROGRAM

(75) Inventor: Tsuyoshi Takahashi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 730 days.

(21) Appl. No.: 11/901,544

(22) Filed: Sep. 18, 2007

(65) Prior Publication Data

US 2008/0151435 A1 Jun. 26, 2008

(30) Foreign Application Priority Data

Dec. 26, 2006 (JP) ................................ 2006-349424

(51) Int. Cl.
*G11B 5/09* (2006.01)
(52) U.S. Cl. ........................................................ 360/46
(58) Field of Classification Search ................ 360/46, 360/66, 65, 67, 75, 25, 128, 323, 31
See application file for complete search history.

(56) References Cited

U.S. PATENT DOCUMENTS

| | | | | |
|---|---|---|---|---|
| 2,913,652 A * | 11/1959 | Greenberg et al. | ........... | 388/816 |
| 3,497,610 A * | 2/1970 | Hartai et al. | ............... | 358/410 |
| 3,517,308 A * | 6/1970 | Mirdadian | .................... | 324/161 |
| 5,426,537 A * | 6/1995 | Yeh et al. | ....................... | 360/46 |
| 5,438,470 A * | 8/1995 | Ravipati et al. | ............... | 360/322 |
| 5,739,706 A * | 4/1998 | Okamoto | ....................... | 327/110 |
| 5,751,510 A * | 5/1998 | Smith et al. | ..................... | 360/67 |
| 6,002,539 A * | 12/1999 | Smith et al. | ..................... | 360/65 |
| 6,088,176 A * | 7/2000 | Smith et al. | ..................... | 360/46 |
| 6,150,809 A * | 11/2000 | Tiernan et al. | ................ | 324/238 |
| 6,195,219 B1 * | 2/2001 | Smith | ............................ | 360/66 |
| 6,246,553 B1 * | 6/2001 | Biskeborn | ..................... | 360/323 |
| 6,384,994 B1 * | 5/2002 | Smith et al. | ..................... | 360/25 |
| 6,657,830 B2 * | 12/2003 | Ito et al. | ....................... | 360/324.2 |
| 6,831,807 B2 * | 12/2004 | Koso et al. | ................ | 360/78.05 |
| 6,917,499 B2 * | 7/2005 | Ito et al. | ....................... | 360/324.2 |
| 7,062,698 B2 | 6/2006 | Yang | | |
| 7,119,990 B2 * | 10/2006 | Bajorek et al. | ................ | 360/128 |
| 7,268,965 B2 * | 9/2007 | Brannon et al. | ................ | 360/75 |
| 2002/0181135 A1 * | 12/2002 | Takeuchi et al. | ................ | 360/66 |
| 2007/0230008 A1 * | 10/2007 | Shinomiya et al. | ............. | 360/66 |

FOREIGN PATENT DOCUMENTS

| | | |
|---|---|---|
| JP | 2003-178402 | 6/2003 |
| WO | WO 02/093564 | 11/2002 |

* cited by examiner

*Primary Examiner* — Fred Tzeng
(74) *Attorney, Agent, or Firm* — Greer, Burns & Crain, Ltd.

(57) ABSTRACT

According to one embodiment, a storage apparatus includes: a read section that receives a predetermined electrical parameter to read out data from a recording medium; a characteristic detection section that detects a plurality of characteristic values corresponding to a plurality of different predetermined electrical parameters received by the read section, respectively, the characteristic values being predetermined indicators of the read section, respectively; a characteristic relation acquisition section that acquires a slope of a characteristic value versus a predetermined electrical parameter from the predetermined electrical parameters and the characteristic values; and a determination section that determines presence/absence of failure in the read section based on the slope acquired by the characteristic relation acquisition section.

18 Claims, 8 Drawing Sheets

STORAGE APPARATUS, METHOD OF DETECTING FAILURE IN HEAD OF STORAGE APPARATUS, AND STORAGE MEDIUM STORING FAILURE DETECTION PROGRAM

BACKGROUND OF THE INVENTION

1. Field of the Invention

The present invention relates to a storage apparatus, a method of detecting a failure in a head of a storage apparatus, and a storage medium storing a failure detection program. And more particularly, to a storage apparatus which is provided with a tunnel effect MR head (TuMR head) as a head to thereby read information from a recording medium such as a magnetic disk, a method of detecting a failure in a head of a storage apparatus, and a storage medium storing a failure detection program.

2. Description of the Related Technology

In a storage apparatus, (for example, an HDD that has recently been used in various types of products such as a desktop PC, notebook PC, server, audio-visual equipment, and automobile product), linear density (BPI)/transfer rate is improved along with improvement in the recording density (surface density). In recent years, various types of magnetic disk heads supporting a higher transfer rate are developed in order to allow the technological update of the storage apparatus and produced on a commercial basis.

As one of the above magnetic disk heads, there is known a TuMR head which is based on tunnel effect (refer to, e.g., Patent Document 1 (Patent Publication WO2002/093564)). A magnetic recording/reproducing apparatus disclosed in this Patent Document 1 has a TuMR head serving as a magnetic reproducing head and a signal processing circuit for supplying a signal detection current and voltage to the TuMR head and amplifying and processing a signal obtained from the TuMR head. In this magnetic recording/reproducing apparatus, when the SNR of a detection signal processed in the signal processing circuit exhibits the maximum value within a predetermined range of voltages applied to the TuMR head, the TuMR head is driven by a voltage drive circuit; otherwise, the TuMR head is driven by a current drive circuit. The TuMR head is used as a mainstream reading head for a magnetic recording/reproducing apparatus regardless of whether the magnetic recording/reproducing apparatus adopts a horizontal recording mode or vertical recording mode.

However, the TuMR head is still in the early days of its development and therefore has a problem concerning long-term reliability throughout product life under today's situation that quality verification time must be shortened.

SUMMARY OF THE INVENTION

The present invention has been made to solve the above problem, and an object thereof is to provide a storage apparatus, a method of detecting a failure in a head, and a failure detection program capable of ensuring long-term reliability of a storage apparatus using, e.g., a TuMR head as a reading head.

To solve the above problem, according to a first aspect of the present invention, there is provided a storage apparatus comprising: a read section that receives a predetermined electrical parameter to read out data from a recording medium; a characteristic detection part that detects a plurality of characteristic values which are predetermined indicators of the read section corresponding to the plurality of different predetermined electrical parameters that have been given to the read part; a characteristic relation acquisition part that acquires as a characteristic relation a relationship between the predetermined electrical parameter and characteristic value from the predetermined electrical parameter and plurality of characteristic values acquired by the characteristic detection part; and a determination section that determines presence/absence of failure in the read part based on the characteristic relation acquired by the characteristic relation acquisition part.

In the storage apparatus according to the present invention, the characteristic detection part detects the characteristic value in a temporal manner as well as the characteristic relation acquisition part acquires the characteristic relation in a temporal manner based on the characteristic value that has been detected in a temporal manner, and the characteristic relation acquisition part determines presence/absence of failure in the read part based on a temporal change in the characteristic relation.

In the storage apparatus according to the present invention, the characteristic relation is a slope of the characteristic value corresponding to the predetermined electrical parameters obtained at a plurality of measurement points.

Further, according to a second aspect of the present invention, there is provided a method of detecting a failure in a head of a storage apparatus, comprising: a read step that gives a plurality of different predetermined electrical parameters to a head to read out data from a recording medium using the head; a characteristic detection step that detects a characteristic value which is a predetermined indicator of the head corresponding to the predetermined electrical parameter that has been given in the read step; a characteristic relation acquisition step that acquires as a characteristic relation a relationship between the predetermined electrical parameter and characteristic value from the predetermined electrical parameter and plurality of characteristic values acquired by the characteristic detection step; and a determination step that determines presence/absence of failure in the head based on the characteristic relation acquired by the characteristic relation acquisition step.

Further, according to a third aspect of the present invention, there is provided a storage medium storing a failure detection program that allows a computer to execute a method of detecting a failure in a head of a storage apparatus, the program allowing the computer to execute: a read step that gives a plurality of different predetermined electrical parameters to a head to read out data from a recording medium using the head; a characteristic detection step that detects a characteristic value which is a predetermined indicator of the head corresponding to the predetermined electrical parameter that has been given in the read step; a characteristic relation acquisition step that acquires as a characteristic relation a relationship between the predetermined electrical parameter and characteristic value from the predetermined electrical parameter and plurality of characteristic values acquired by the characteristic detection step; and a determination step that determines presence/absence of failure in the head based on the characteristic relation acquired by the characteristic relation acquisition step.

According to the present invention, there can be provided a storage apparatus, a method of detecting a failure in a head of a storage apparatus, and a storage medium storing a failure detection program capable of ensuring long-term reliability.

DETAILED DESCRIPTION OF THE PREFERRED EMBODIMENTS

An embodiment of the present invention will be described below, taking a magnetic disk drive as an example of a storage apparatus.

Figure 1:
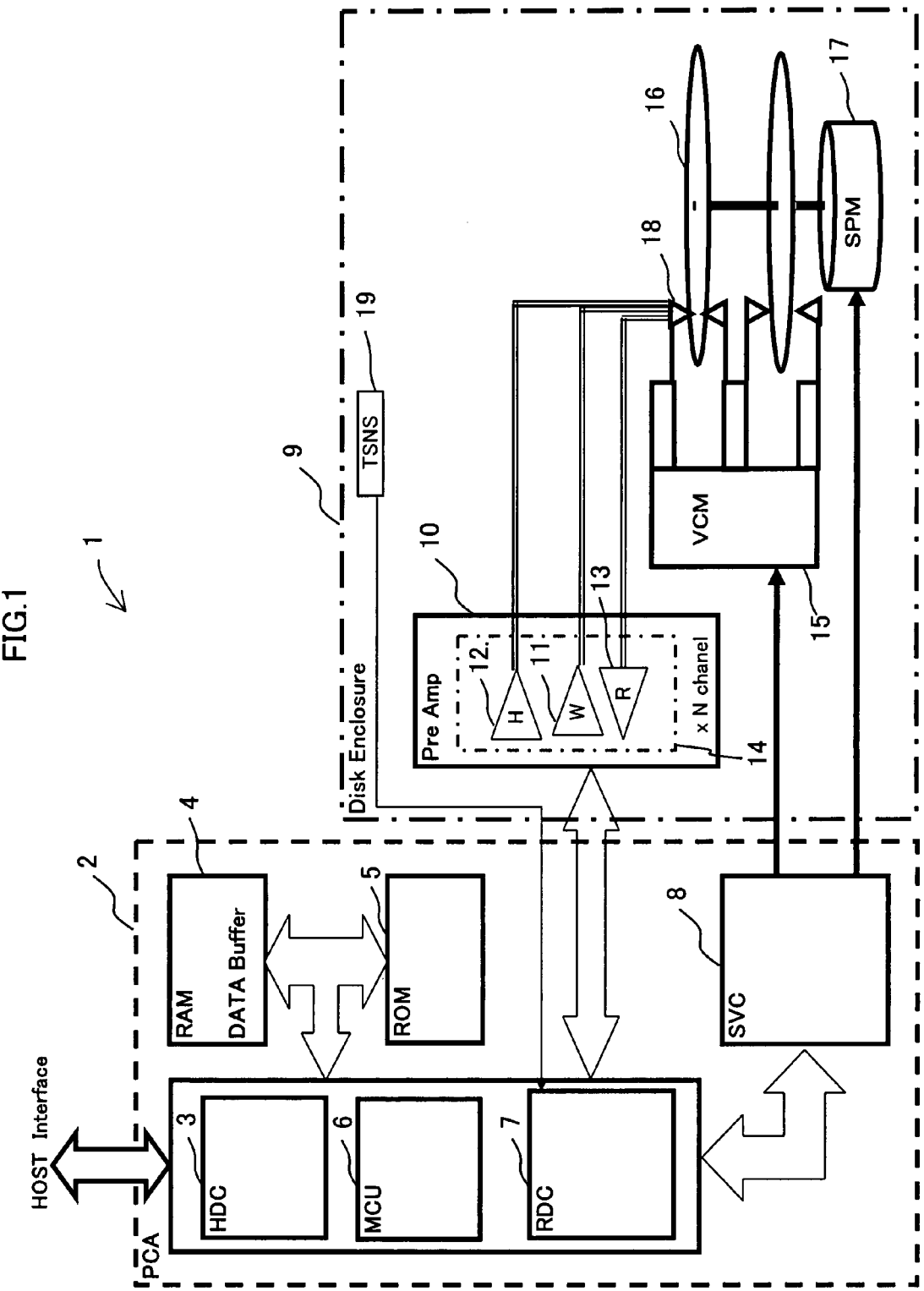
FIG. 1 is a block diagram showing a configuration of magnetic disk drive (HDD) according to an embodiment of the present invention.

FIG. 1 is a block diagram showing a configuration of magnetic disk drive (HDD) 1 according to an embodiment of the present invention. The HDD 1 has, on the side of a PCA (Printed Circuit Assembly) 2 that controls operation of the HDD and controls communication with a HOST Interface, an HDC (Hard Disk Controller) 3 that mainly performs interface protocol control, data buffer control, and disk format control and an MCU (Micro Control Unit) 6 that controls the HDC 3, an RDC (Read channel) 7, and an SVC (Servo Control IC) 8 as well as manages a RAM (Random Access Memory) 4 and a ROM (Flash ROM) 5. The RDC 7 performs data write/read control (data modulation/demodulation) and SVC 8 performs VCM control and SPM control.

The HDD 1 has, on the side of a disk enclosure 9, a preamplifier 10 which is a fixed amplifier that performs write operation for a head and read operation from the head. The number of channels provided in the preamplifier 10 corresponds to the number (N) of heads.

The preamplifier 10 includes a write driver 11, a heater driver 12, a read preamplifier 13 and a control circuit 14 therefor.

Further, the HDD 1 has an VCM (Voice Coil Motor) 15 that controls operation of an actuator supporting a head, an SPM (Spindle Motor) 17 that controls rotation of a spindle shaft holding a magnetic disk 16 which is a recording medium to which data is written for storage, and a dual head 18 having a write head for data write and an MR head for data read. The HDD 1 in the embodiment corresponds to a storage apparatus of the present invention. The head in the present embodiment corresponds to a read part of the present invention. A characteristic detection section, a characteristic relation acquisition section, and a determination section are each constituted by the head 18, preamplifier 10, RAM 4, ROM 5, and MCU 6.

The HDD according to the embodiment of the present invention makes a determination of the occurrence of head (TuMR) failure for itself. That is, in the case where a given characteristic relation exceeds a threshold value (predetermined range) before product shipment, or in the case where the characteristic relation fluctuates with time, the HDD determines that the HDD itself do not meet product shipment criterion and thereby removed from a shipment list during a test process.

The above test process may be performed at any stage (e.g., in an assembled state of a head suspension, after the head suspension assembly has been fitted to an actuator arm, or the like) of the assembly process of the storage apparatus.

Therefore, it is possible to remove a faulty head before the assembly of the storage apparatus has been completed. Thus, selection of a sophisticated head can be made with the result that only the selected sophisticated head is mounted on the storage apparatus, enabling the storage apparatus to be a product of high performance and excellent reliability.

Further, the HDD according to the present embodiment performs periodic monitoring for itself after product shipment. That is, in the case where a given characteristic relation exceeds a threshold value (predetermined range), or in the case where the characteristic relation fluctuates with time (temporally changes), the HDD generates an alarm to notify a user of the occurrence of failure and thereby reliability of the TuMR, which is a write head, is always ensured.

Therefore, it is possible to notify the user of failure in the head before the storage apparatus cannot normally perform its recording/reproducing operation. Thus, the user can make adequate responses such as repair and data backup, enabling improvement in reliability of the storage apparatus.

In the periodic monitoring performed after product shipment, power-on count (the number of times of power-on operations) or access count is recorded as a history. The monitoring is performed every time the power-on count or access count reaches a predetermined count and thereby the temporal change can be determined.

Operation of the present embodiment will be described as follows.

Figure 2:
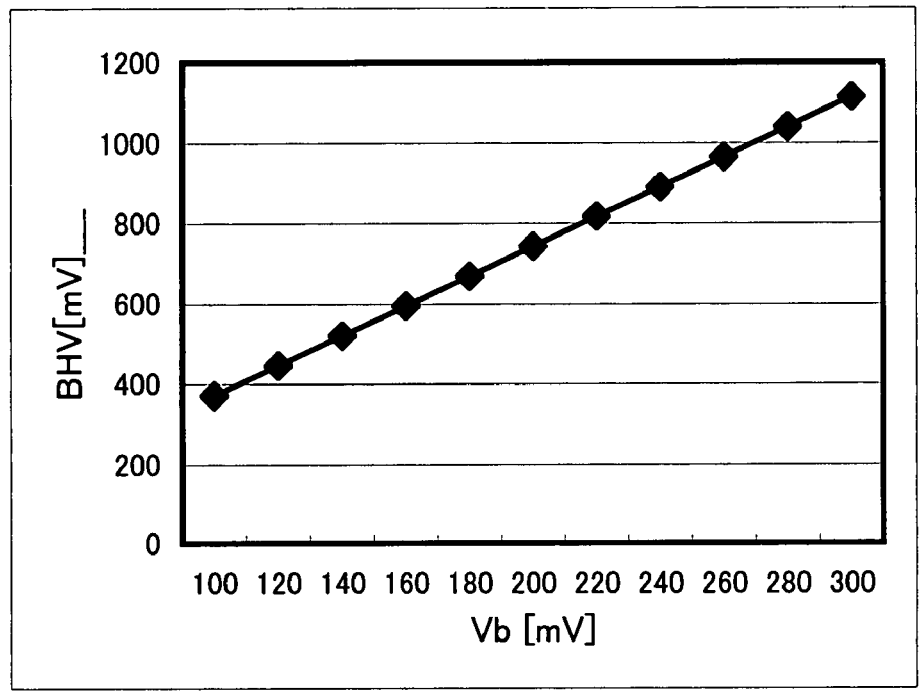
FIG. 2 is a view showing a relationship between a bias voltage (predetermined electrical parameter) Vb applied to a TuMR head and a voltage (one characteristic value) BHV output as a monitor signal corresponding to a head resistance value.

FIG. 2 shows a relationship between a bias voltage (predetermined electrical parameter) Vb applied to the TuMR head and a voltage (one characteristic value) BHV output as a monitor signal corresponding to a head resistance value. In this case, head resistance value Rmr is set to 350 [Ω].

In general, a head IC (Pre Amp) that controls a head of a magnetic disk drive has a monitor circuit represented by the following equation (1). The monitor circuit is used for measuring the head resistance value Rmr.

$$BHV = A*(Vb/Rmr) \qquad (1)$$

(A is fixed gain)

Figure 3:
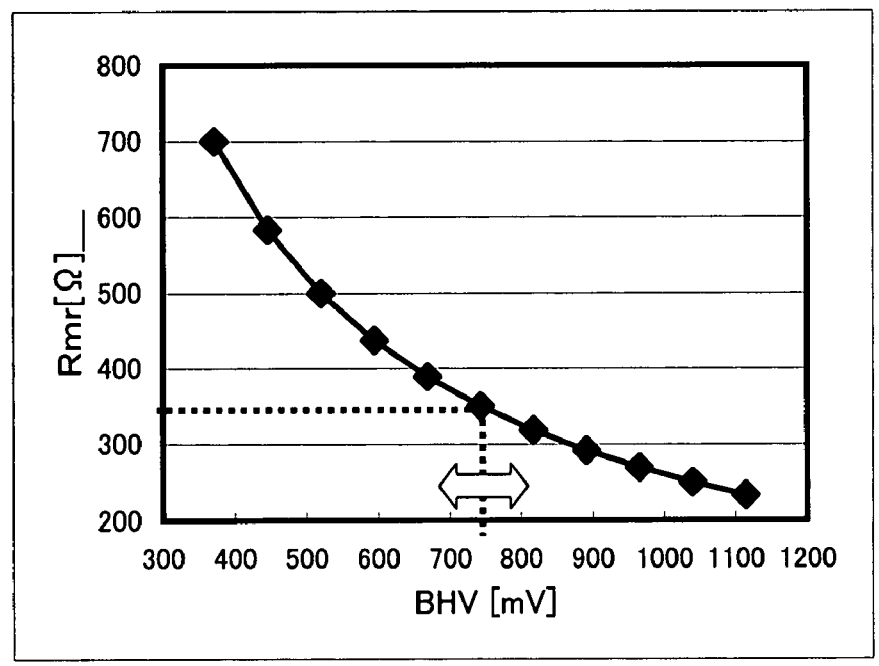
FIG. 3 is a view showing a relationship between the monitor voltage BHV and a head resistance value Rmr.

In the case where a given constant bias voltage is applied, a relationship between the monitor voltage BHV and head resistance value Rmr as shown in FIG. 3 is obtained, and the head resistance value can be obtained from the BHV voltage. In the example of FIG. 3, the bias voltage is set to 200 [mV].

The following equation (2) is an inverse operation of the equation (1).

$$Rmr = A*(Vb/BHV) \qquad (2)$$

In the case where the head resistance value Rmr assumes 350 [ω] in FIG. 3, the BHV assumes about 740 [mV]. In this manner, a change in the Rmr can be detected by a change in the BHV.

In the present embodiment, the above relationships are used to obtain a relationship (characteristic relation or correlation) between the head resistance value (characteristic value) and bias voltage (electrical parameter). Then, a slope representing the relationship between the head resistance and bias voltage or a temporal change in the slope is detected to thereby determine presence/absence of failure. When it is determined that failure has occurred, the failure detection alarm is generated.

The head resistance value keeps constant unless degradation of the head element occurs. However, in some heads, the resistance value thereof changes depending on frequency of use. In order to cope with this, the monitor voltage BHV is monitored to thereby capture a temporal change in the head resistance value, and determination is made as follows: when a change rate of the head resistance value falls within a given standard value range, the head is determined to be normal, while when the change rate falls outside the standard value range, the head is determined to be abnormal and the failure detection alarm is generated. This can increase reliability in the failure detection as compared to the case where the occurrence of failure is determined only by detecting the slope.

A failure detection means using the temporal change monitors the initial state during the product shipment process to acquire a relationship (characteristic relation) between the head resistance value (characteristic value) and bias voltage and further measures (periodically) the slope once again after the pre-shipment test is conducted. In this manner, a change in the slope is detected before product shipment to thereby detect degradation of the head element, if it occurs.

Figure 4:
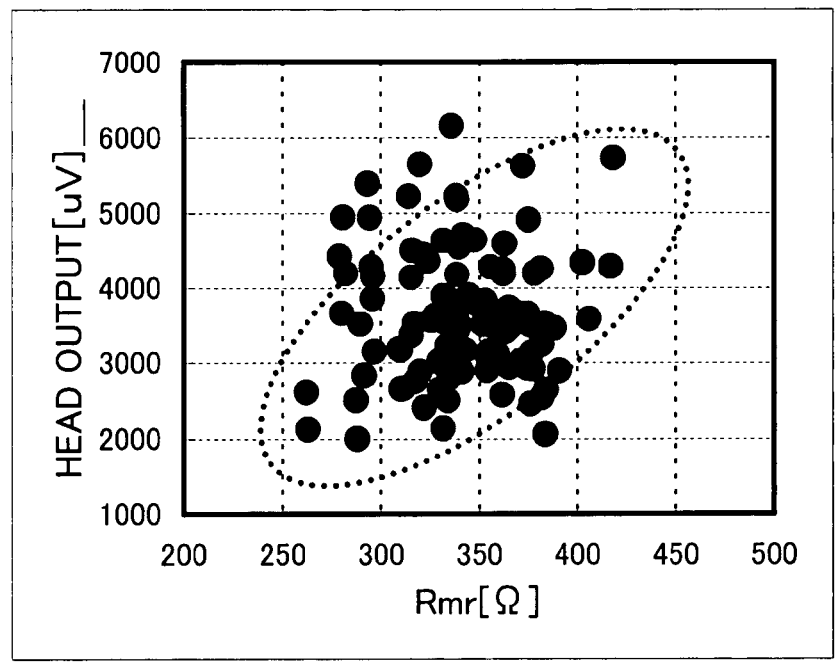
FIG. 4 is a view showing a correlation between the head resistance value Rmr and its output obtained at a specific write frequency.

FIG. 4 shows a correlation between the head resistance value Rmr and its output obtained at a specific write frequency. Although the degree of correlation in the characteristic relation is low, the relation assumes that the higher the head resistance value Rmr, the higher the output voltage becomes. The higher the output value, the better the S/N ratio is, so that it is known that the error rate obtained from the S/N ratio is acceptable. Therefore, it can be said in general that in the case where the head resistance value is changed, the error rate for the head correspondingly fluctuates.

Figure 5:
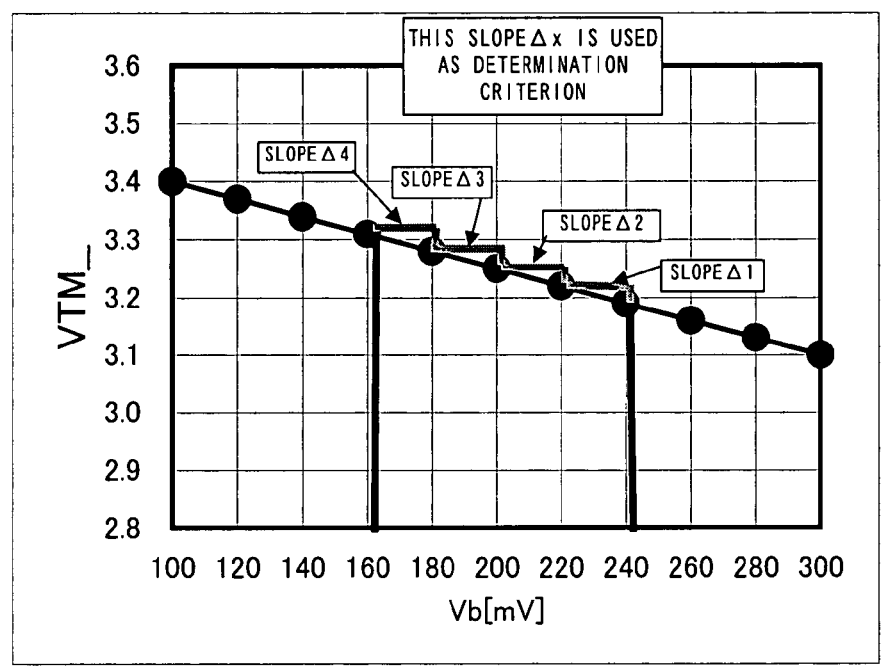
FIG. 5 is a view showing a correlation between the bias voltage Vb and error rate in the case where the bias voltage Vb is applied to the head through a Pre Amp.

FIG. 5 shows a correlation between the bias voltage Vb and error rate in the case where the bias voltage Vb is applied to the head through the Pre Amp. The term "VTM" denotes a value obtained by a monitoring method that indicates the error rate in a simple manner. In FIG. 5, there exists a linear correlation (characteristic relation) between the VTM and change in the Vb with a given slope. However, it has been found that if a change occurs in the head resistance value, such a relationship cannot be established. Note that although the VTM (Viterbi Trellis Margin) is also referred to as CSM (Channel Statistics Measurement), the former one is used in this specification. The VTM is defined by counts obtained in the case where a difference between metric values associated with two paths falls below a given threshold value and given by the total sum of the counts at 100-sector (about 400,000 bits) read time.

Thus, as shown in FIG. 5, a correlation (characteristic relation) between the bias voltage and simple error rate monitor VTM is first acquired. In the case where the correlation exceeds a predetermined threshold value, it is determined that failure has occurred. On the other hand, in the case where it is determined that no failure has occurred, the initial value of the correlation is retained and, if the retained value exceeds a given standard in the course of time, it is determined that failure due to deterioration with time has occurred and thereby the failure detection alarm is generated. In the following description, the VTM which corresponds to the resistance value is used as a characteristic value.

Note that FIG. 5 shows a case where the VTM is measured at five measurement points of the bias voltage Vb which is a predetermined electrical parameter, at which a plurality of values different from one another are obtained. The measurement points may be determined arbitrarily as long as at least two measurement points at which the slope therebetween can be obtained are selected.

The example of FIG. 5 has four slopes Δ1 to Δ4. In general, Δx (x=2 to n, where n is integer number) is used. This Δx is set as a parameter used for determining, in terms of the slope, presence/absence of the occurrence of failure (that is, Δx is set as a parameter used for determining presence/absence of the occurrence of failure in the initial state) and, at the same time, is stored as an initial value for determining presence/absence of occurrence of failure due to temporal change of the slope. Further, a given threshold value is provided to thereby recognize presence/absence of a change. In the case where a change occurs, the failure detection alarm is generated. In this manner, whether each product is acceptable or not is determined in the test process before product shipment.

Further, in the field operation after product shipment, the periodic monitoring is allowed to be automatically performed for alarm notification to the user.

Figure 6:
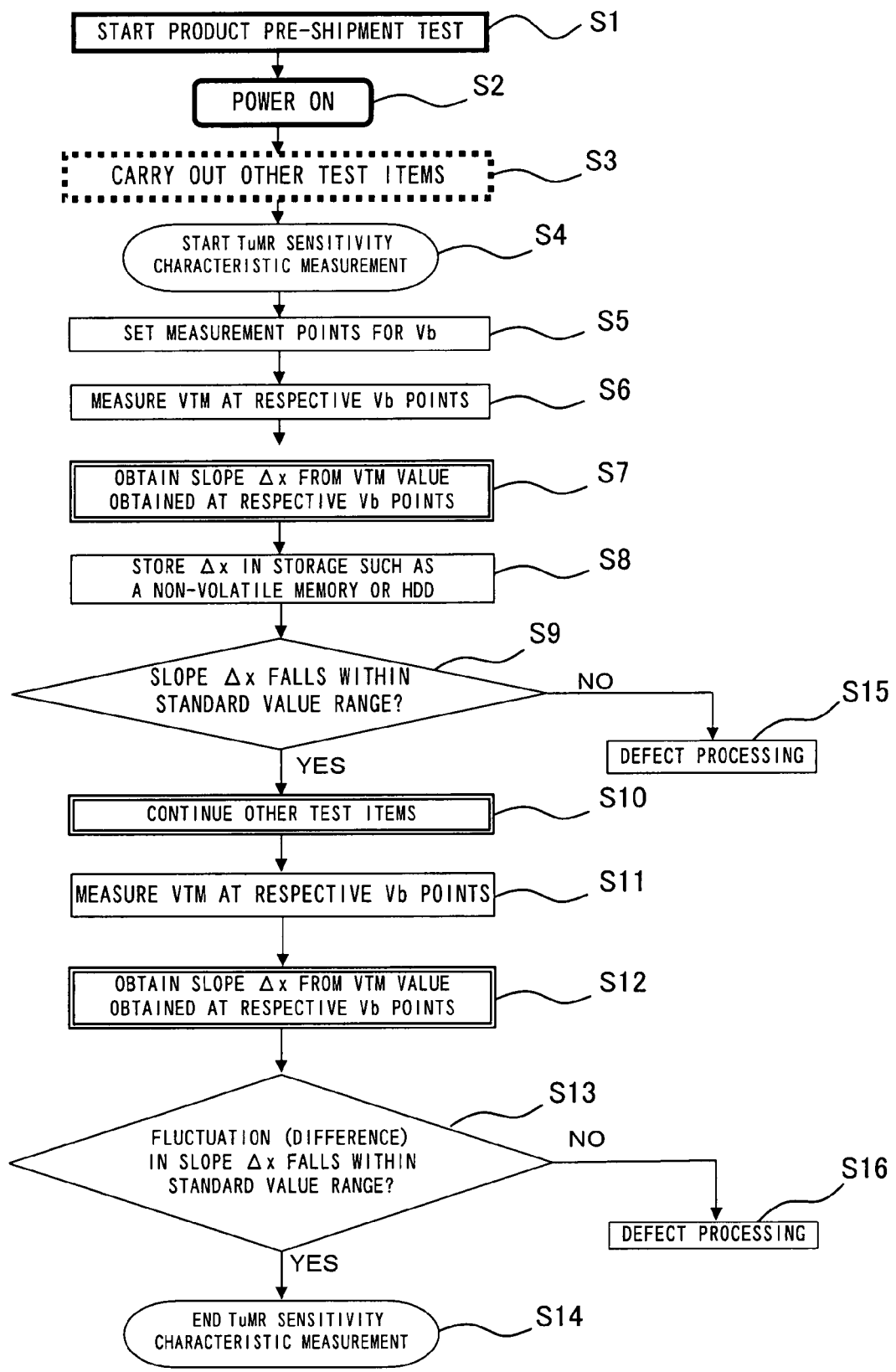
FIG. 6 is a flowchart showing operation of failure determination processing performed before product shipment.
Figure 7:
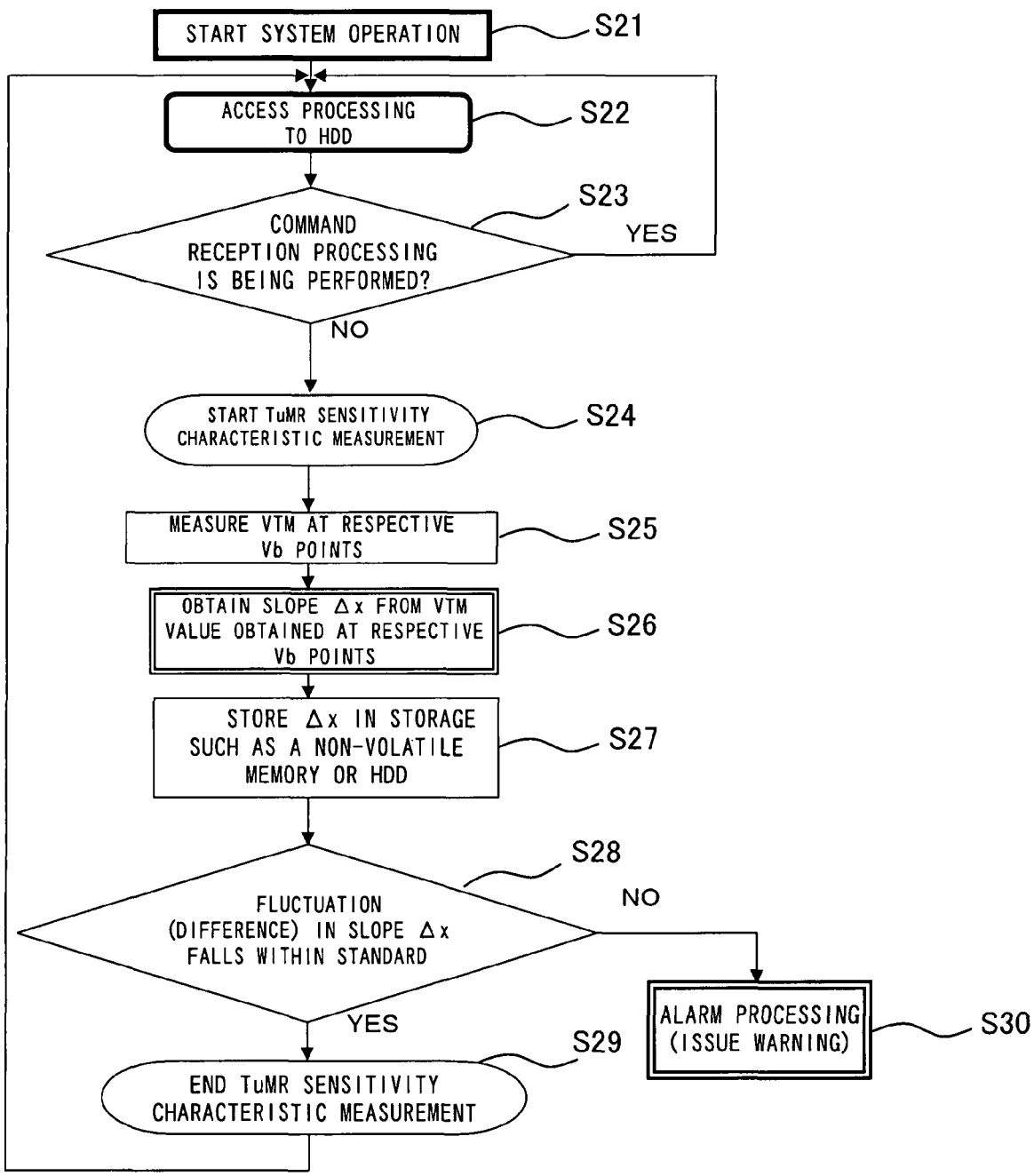
FIG. 7 is a flowchart showing operation of failure determination processing performed after product shipment.

A concrete example of above operation will be described using flowcharts Of FIG. 6 and FIG. 7. FIG. 6 is a flowchart showing operation of failure determination processing performed before product shipment.

After a product pre-shipment test is started (step S1) to turn the power ON (step S2), a predetermined test is carried out (step S3) and, after that, the operation according to the present embodiment is started appropriately (step S4). First, a plurality of voltage values (points) are set for the bias voltage to be measured (step S5). The VTM (characteristic value) which corresponds to the head resistance value is measured at the set points (step S6), and slope Ax is obtained from the VTM values at the respective points (step S7). Then, the slope is set as an initial value and stored in a memory (step S8), and it is determined whether the slope falls within a standard value range (in other words, whether the slope exceeds a predetermined threshold value) (step S9). In the case where it is determined that the slope does not fall within the standard value range (N in step S9), it is determined that failure (defect) has occurred and the failure detection alarm is generated (step S15). In the case where it is determined that the slope falls within the standard value range (Y in step S9), it is determined that no failure has occurred.

Then, after test items other than those according to the present embodiment are carried out (step S10), the VTM is measured once again at the respective points set in step S5 (step S11), and the slope Δx is obtained in the similar manner as step S7 (step S12). Then, a difference between the slope obtained in step S12 and that obtained in step S7 is obtained and, then, whether the difference falls within a predetermined standard value range is determined. In the case where it is determined that the difference does not fall within the standard value range (in other words, in the case where it is determined that the difference exceeds the standard value range) (N in step S13), it is determined that failure (defect) has occurred and the failure detection alarm is generated (step S16). In the case where it is determined that the difference does not exceed the standard value range (Y in step S13), it is determined that no failure has occurred, and this flow is ended (step S14).

In the case where a plurality of heads are provided, the same failure determination processing is performed for respective heads.

Next, failure determination processing performed after product shipment will be described. FIG. 7 is a flowchart showing operation of failure determination processing performed after product shipment.

After power is turned ON to activate system operation (step S21), access processing is made to the HDD (step S22). Then, it is determined whether command reception processing is being performed (step S23) and, in the case where it is determined that the command reception processing is not being performed (in other words, the HDD is in its idle time) (N in step S23), TuMR head failure determination processing is started (step S24).

Alternatively, a configuration may be adopted in which power-on count or access count is stored as a history and TuMR head failure determination processing is started during the idle time at the timing at which the power-on count or access count exceeds a predetermined count (for example, when the power-on count reaches 100 or 1000).

The VTM is measured at the respective points set in step 5 of FIG. 6 (step S25). Subsequently, the slope Δx is obtained from the VTM values (step S26) and stored in a memory (step S27). Then, a difference between the slope obtained in step S26 and that obtained in step S12 of FIG. 6 is obtained and, then, whether the difference falls within a predetermined standard value range is determined (step S28). In the case where it is determined that the difference exceeds a predetermined standard value range (in other words, in the case where it is determined that the difference does not fall within the standard value range) (N in step S28), it is determined that failure (defect) has occurred and the failure detection alarm is generated (step S30). In the case where it is determined that the difference does not exceed the standard value range (Y in step S28), it is determined that no failure has occurred, and this flow is ended (step S29).

FIGS. 8 to 12 show examples in which failure is determined to occur in steps S13 and S29. In the respective graphs, the line whose measurement points are denoted by black dots represents the initial value of the characteristic value acquired in step S6, and the line whose measurement points are denoted by squares represents the characteristic value acquired in steps S11 and S26.

Figure 8:
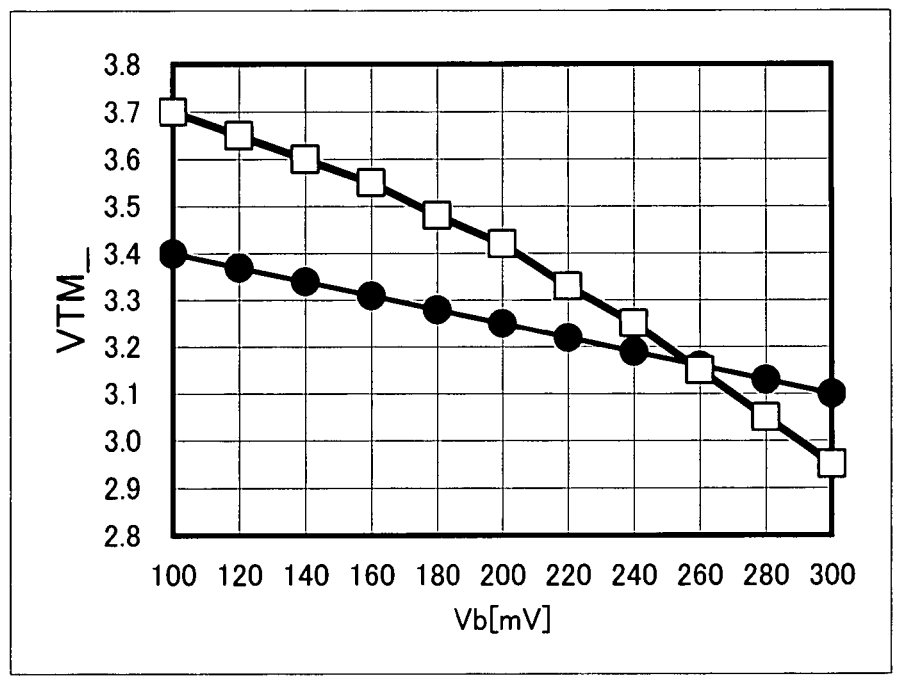
FIG. 8 is a view showing a characteristic relation between the bias voltage and VTM, which shows a first example in which failure is determined to occur.

FIG. 8 shows a case where sensitivity with respect to the initial value becomes high and thereby the slope corresponding to the bias voltage Vb becomes steeper. In this case, there is no problem if the change falls within a given threshold value range. However, if the change exceeds an estimated range, the failure detection alarm is generated.

Figure 9:
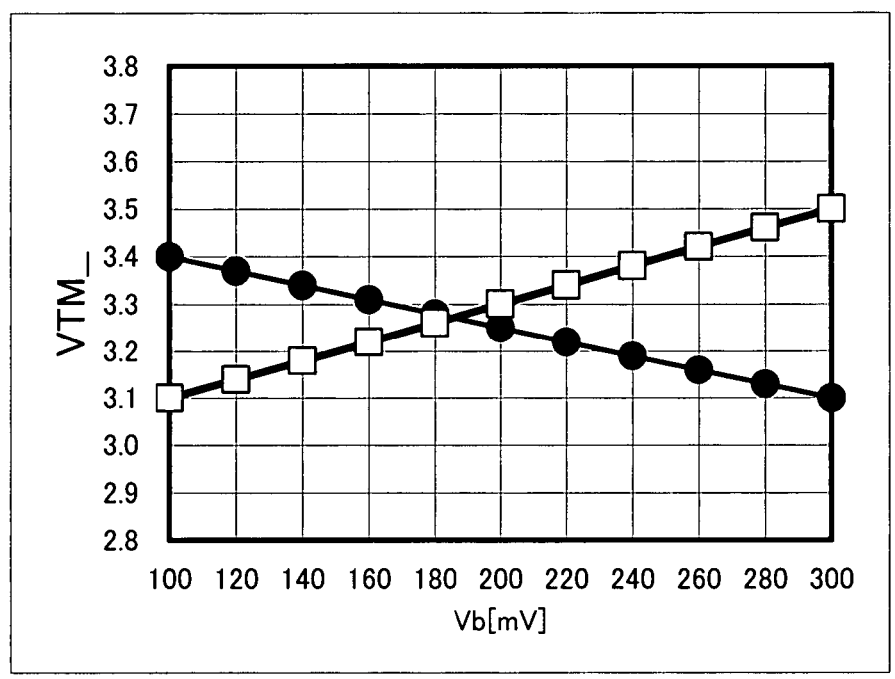
FIG. 9 is a view showing a characteristic relation between the bias voltage and VTM, which shows a second example in which failure is determined to occur.

FIG. 9 shows a case where the entire average slope is changed from a downward slope characteristic (monotone decreasing slope) to an upward slope (monotone increasing slope). In this case, the slope polarity is reversed relative to that determined by the initial values as shown in FIG. 9, so that it is determined that the change exceeds a threshold value and the failure detection alarm is generated.

Figure 10:
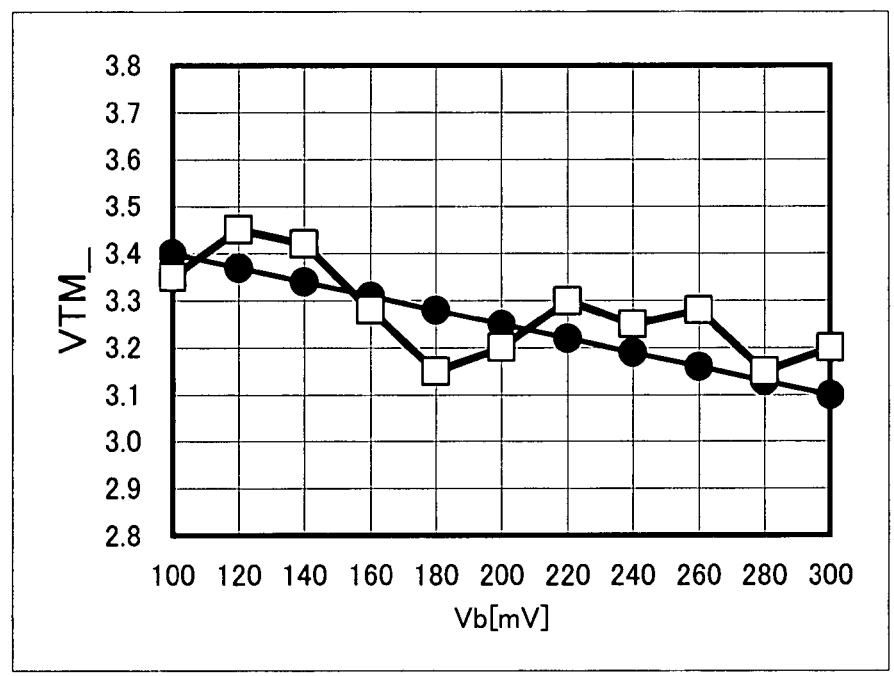
FIG. 10 is a view showing a characteristic relation between the bias voltage and VTM, which shows a third example in which failure is determined to occur.

FIG. 10 shows a case where VTM measurement is carried out while the bias voltage Vb being changed. In this case, VTM characteristic fluctuates for each measurement. As can be seen in FIG. 10, positive and negative slope polarities exist and, further, the characteristic value (partial slope) fluctuates. Therefore, the head is determined to have unstable characteristic and the failure detection alarm is generated.

Figure 11:
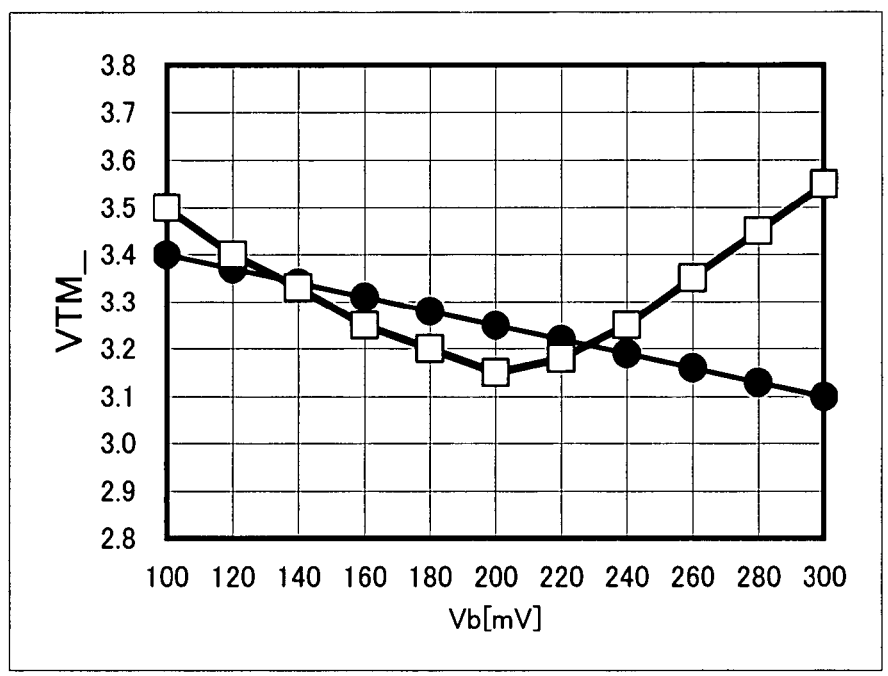
FIG. 11 is a view showing a characteristic relation between the bias voltage and VTM, which shows a fourth example in which failure is determined to occur.
Figure 12:
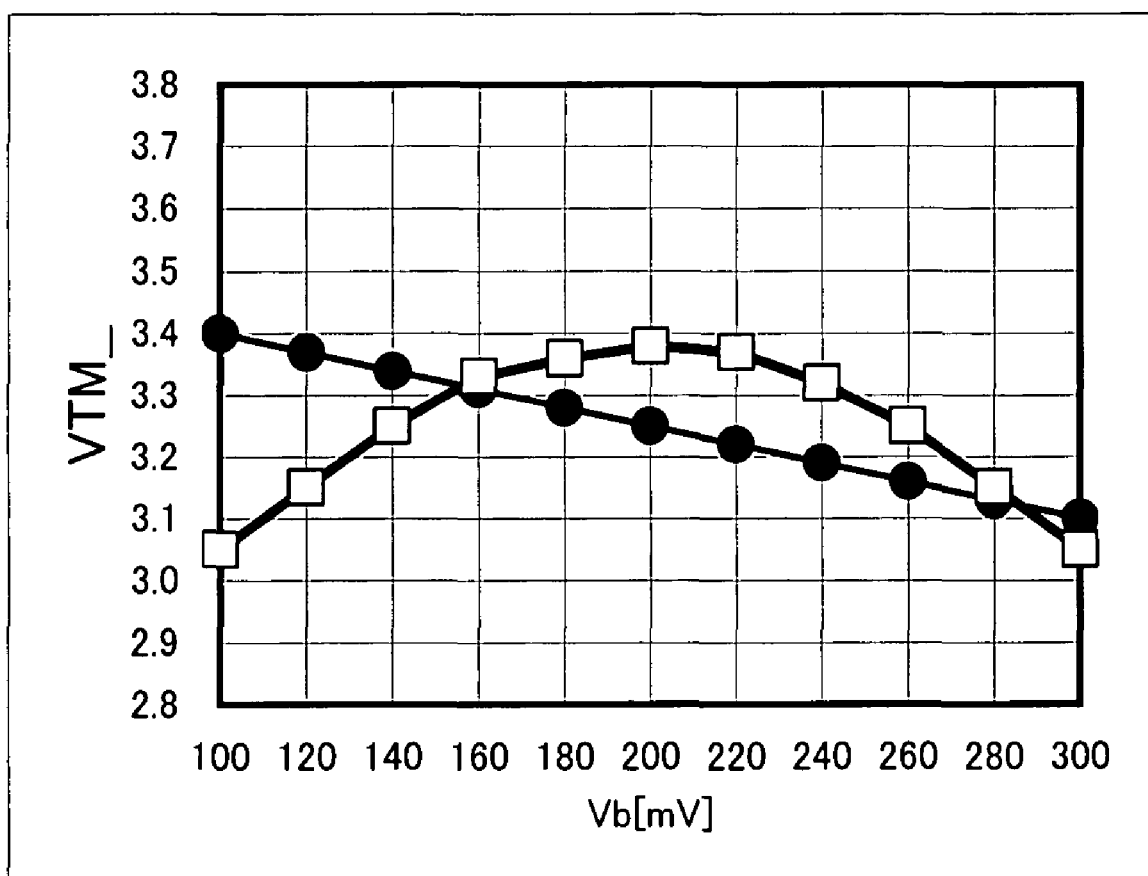
FIG. 12 is a view showing a characteristic relation between the bias voltage and VTM, which shows a fifth example in which failure is determined to occur.

FIG. 11 shows a case where the VTM characteristic is changed from monotone decreasing to monotone increasing (i.e., polarity of a partial average slope is reversed). Conversely, FIG. 12 shows a case where the VTM characteristic is changed from monotone increasing to monotone decreasing. In the examples of FIG. 11 and FIG. 12, the sensitivity of the TuMR with respect to the Vb has been changed. Thus, also in these cases, there is a possibility that the head is determined to have unstable characteristic and the failure detection alarm is generated.

As described above, the initial characteristic of the TuMR head is measured and, after a given time period has elapsed, the characteristic thereof is measured once again. In the case where the initial characteristic has been changed by a degree exceeding a given allowance, it is possible to recognize that the sensitivity of the head is changed.

In such a case, it can be determined that any failure has occurred in the characteristic of the head and, accordingly, it can be considered that there is a problem in reliability of the head. Therefore, it seems unlikely that the head whose sensitivity characteristic has been changed will be workable, so that the relevant head is determined to be treated as a defective one.

Further, even after product shipment, the failure detection alarm is generated if failure has occurred. This enables early replacement of the defective head. As described above, action on the head whose characteristic has been changed can be taken before product shipment, as well as, the characteristic change can be detected at an early stage even after product shipment, thereby providing a magnetic disk drive having high reliability.

Although a magnetic disk drive is used in the above embodiment, it goes without saying that the present invention is also applicable to a disk drive other than the magnetic disk drive, such as a flexible disk drive or magneto-optical disk drive.

Further, when a program that allows a computer to execute the above operation steps shown in the flowcharts of the embodiment, a failure detection program of the present invention can be provided. By storing this failure detection program in a computer-readable storage medium, it is possible to allow the computer to execute the program. The computer mentioned here includes: a host device such as a personal computer, a controller for a test apparatus, and a controller such as MPU or CPU of a storage apparatus. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

What is claimed is:
1. A magnetic disk drive comprising:
   a magnetic head that receives a predetermined bias voltage to read out data from a recording medium;
   a characteristic detection section that detects a plurality of Viterbi Trellis Margins (VTMs) corresponding to a plurality of different bias voltages received by the magnetic head, respectively, the VTMs being a predetermined indicator of the magnetic head and being a value indicating an error rate in the bias voltage in a simple manner;
   a characteristic relation acquisition section that acquires a slope of correlation between the bias voltages and the VTMs; and a determination section that determines presence/absence of failure in the magnetic head based on the slope acquired by the characteristic relation acquisition section.

2. The magnetic disk drive according to claim 1, wherein the determination section quantifies the slope acquired by the characteristic relation acquisition section and determines that failure has occurred in the read section in the case where the quantified slope exceeds a predetermined threshold value.

3. The magnetic disk drive according to claim 1, wherein:
the characteristic detection section detects the characteristic values over time as well as the characteristic relation acquisition section acquires the slope over time based on the characteristic values detected over time, and
the characteristic relation acquisition section determines presence/absence of failure in the read section based on a change over time in the slope.

4. The magnetic disk drive according to claim 1, wherein the slope is obtained at a plurality of measurement points.

5. The magnetic disk drive according to claim 4, wherein a portion of slopes obtained at the measurement points is used as the slope.

6. The magnetic disk drive according to claim 4, wherein an average of slopes obtained at the measurement points is used as the slope.

7. The magnetic disk drive according to claim 1, wherein a change in the slope is used as the slope.

8. The magnetic disk drive according to claim 1, wherein the read section is a tunnel effect type reproducing head.

9. The magnetic disk drive according to claim 1, wherein the VTMs are a value defined by counts obtained in a case where a difference between metric values associated with the two paths falls below a given threshold value.

10. A method of detecting a failure in a head of a magnetic disk drive, comprising:
a read step that gives a plurality of different predetermined bias voltages to a magnetic head to read out data from a recording medium using the magnetic head;
a characteristic detection step that detects Viterbi Trellis Margins (VTMs) corresponding to the bias voltages, respectively, the VTMs being a predetermined indicator of the magnetic head and being a value indicating an error rate in the bias voltage in a simple manner;
a characteristic relation acquisition step that acquires a slope of correlation between the bias voltages and the VTMs; and
a determination step that determines presence/absence of failure in the magnetic head based on the slope acquired by the characteristic relation acquisition step.

11. The method of detecting a failure in a head of a storage apparatus according to claim 10, wherein the determination step quantifies the slope acquired by the characteristic relation acquisition step and determines that failure has occurred in the head in the case where the quantified slope exceeds a predetermined threshold value.

12. The method of detecting a failure in a head of a storage apparatus according to claim 10, wherein
the characteristic detection step detects the characteristic values as well as the characteristic relation acquisition step acquires the slope over time based on the characteristic values detected over time, and
the characteristic relation acquisition step determines presence/absence of failure in the head based on a change over time in the slope.

13. The method of detecting a failure in a head of a storage apparatus according to claim 10, wherein a change in the slope is used as the slope.

14. The method of detecting a failure in a head of a storage apparatus according to claim 10, wherein the VTMs are a value defined by counts obtained in a case where a difference between metric values associated with two paths falls below a given threshold value.

15. A computer-readable non-transitory storage medium storing therein a computer program for a magnetic disk drive that detects a failure in a magnetic head of the magnetic disk drive, the computer program causing a computer to execute:
a read step that gives a plurality of different predetermined bias voltages to a magnetic head to read out data from a recording medium using the magnetic head;
a characteristic detection step that detects Viterbi Trellis Margins (VTMs) corresponding to the bias voltages, respectively, the VTMs being a predetermined indicator of the magnetic head and being a value indicating an error rate in the bias voltage in a simple manner;
a characteristic relation acquisition step that acquires a slope of correlation between the bias voltages and the VTMs; and
a determination step that determines presence/absence of failure in the magnetic head based on the slope acquired by the characteristic relation acquisition step.

16. The computer-readable non-transitory storage medium according to claim 15, wherein the determination step quantifies the slope acquired by the characteristic relation acquisition step and determines that failure has occurred in the head in the case where the quantified slope exceeds a predetermined threshold value.

17. The computer-readable non-transitory storage medium according to claim 15, wherein:
the characteristic detection step detects the characteristic values over time as well as the characteristic relation acquisition step acquires the slope over time based on the characteristic values detected over time, and
the characteristic relation acquisition step determines presence/absence of failure in the head based on a change over time in the slope.

18. The computer-readable non-transitory storage medium according to claim 15, wherein the VTMs are a value defined by counts obtained in a case where a difference between metric values associated with two paths falls below a given threshold value.

* * * * *